(12) United States Patent
Beda et al.

(10) Patent No.: US 7,808,506 B2
(45) Date of Patent: *Oct. 5, 2010

(54) INTELLIGENT CACHING DATA STRUCTURE FOR IMMEDIATE MODE GRAPHICS

(75) Inventors: Joseph S. Beda, Seattle, WA (US); Adam M. Smith, Kirkland, WA (US); Gerhard A. Schneider, Kirkland, WA (US); Kevin T. Gallo, Woodinville, WA (US); Ashraf A. Michail, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/549,253

(22) Filed: Aug. 27, 2009

(65) Prior Publication Data

US 2009/0315902 A1    Dec. 24, 2009

Related U.S. Application Data

(60) Division of application No. 11/455,166, filed on Jun. 16, 2006, now Pat. No. 7,619,633, which is a continuation of application No. 10/185,775, filed on Jun. 27, 2002, now Pat. No. 7,064,766.

(60) Provisional application No. 60/330,418, filed on Oct. 18, 2001.

(51) Int. Cl.
*G09G 5/36* (2006.01)
*G06T 1/20* (2006.01)
*G06T 15/00* (2006.01)

(52) U.S. Cl. .................. 345/557; 345/419; 345/506

(58) Field of Classification Search ................ 345/557, 345/419, 473, 506
See application file for complete search history.

(56) References Cited

U.S. PATENT DOCUMENTS 5,261,041 A    11/1993    Susman (Continued)

FOREIGN PATENT DOCUMENTS

WO    99/52080    3/1999

(Continued)

OTHER PUBLICATIONS

Hyun Suk Kim et al: "Scene Graph for Dynamic Virtual Environment: Spangraph" International Journal of Virtual Reality, IPI Press, Colorado Springs, CO, US, vol. 4, No. 2, 2000, pp. 12-18, OP001039706 ISSN: 1081-1451 p. 16, col. 2.

(Continued)

*Primary Examiner*—Hau H Nguyen
(74) *Attorney, Agent, or Firm*—Workman Nydegger

(57) ABSTRACT

An intelligent caching data structure and mechanisms for storing visual information via objects and data representing graphics information. The data structure is generally associated with mechanisms that intelligently control how the visual information therein is populated and used. The cache data structure can be traversed for direct rendering, or traversed for pre-processing the visual information into an instruction stream for another entity. Much of the data typically has no external reference to it, thereby enabling more of the information stored in the data structure to be processed to conserve resources. A transaction/batching-like model for updating the data structure enables external modifications to the data structure without interrupting reading from the data structure, and such that changes received are atomically implemented. A method and mechanism are provided to call back to an application program in order to create or re-create portions of the data structure as needed, to conserve resources.

14 Claims, 9 Drawing Sheets

U.S. PATENT DOCUMENTS

| | | | |
|---|---|---|---|
| 5,487,172 A | 1/1996 | Hyatt |
| 5,500,933 A | 3/1996 | Schnorf |
| 5,509,115 A | 4/1996 | Butterfield |
| 5,553,222 A | 9/1996 | Milne |
| 5,555,368 A | 9/1996 | Orton |
| 5,727,141 A | 3/1998 | Hoddie |
| 5,745,761 A | 4/1998 | Celi |
| 5,790,130 A | 8/1998 | Gannett |
| 5,852,449 A | 12/1998 | Esslinger |
| 5,920,325 A | 7/1999 | Morgan |
| 5,930,810 A | 7/1999 | Farros |
| 5,936,632 A | 8/1999 | Cunniff |
| 5,986,667 A | 11/1999 | Jevans |
| 5,986,675 A | 11/1999 | Anderson |
| 5,987,627 A | 11/1999 | Rawlings |
| 6,014,139 A | 1/2000 | Watson |
| 6,075,532 A | 6/2000 | Colleran |
| 6,092,107 A | 7/2000 | Eleftheriadis |
| 6,115,713 A | 9/2000 | Pascucci |
| 6,154,215 A | 11/2000 | Hopcroft |
| 6,195,694 B1 | 2/2001 | Chen |
| 6,215,495 B1 | 4/2001 | Grantham |
| 6,237,092 B1 | 5/2001 | Hayes, Jr. |
| 6,243,856 B1 | 6/2001 | Meyer |
| 6,259,451 B1 | 7/2001 | Tesler |
| 6,266,053 B1 | 7/2001 | French |
| 6,272,650 B1 | 8/2001 | Meyer |
| 6,275,857 B1 | 8/2001 | McCartney |
| 6,314,470 B1 | 11/2001 | Ward |
| 6,377,263 B1 | 4/2002 | Falacara |
| 6,411,297 B1 | 6/2002 | Tampieri |
| 6,487,565 B1 | 11/2002 | Schechter |
| 6,538,656 B1 | 3/2003 | Cheung |
| 6,570,578 B1 | 5/2003 | Smirnov |
| 6,675,230 B1 | 1/2004 | Lewallen |
| 6,707,456 B1 | 3/2004 | Marrin |
| 6,714,201 B1 | 3/2004 | Grinstein |
| 6,717,599 B1 | 4/2004 | Olano |
| 6,731,314 B1 | 5/2004 | Cheng |
| 6,732,109 B2 | 5/2004 | Lindberg |
| 6,741,242 B1 | 5/2004 | Itoh |
| 6,751,655 B1 | 6/2004 | Deutsch |
| 6,765,571 B2 | 7/2004 | Sowizral |
| 6,919,891 B2 | 7/2005 | Schneider |
| 6,986,101 B2 | 1/2006 | Cooper |
| 7,012,606 B2 | 3/2006 | Swedberg |
| 7,055,092 B2 | 5/2006 | Yardumian |
| 7,064,766 B2 | 6/2006 | Beda |
| 7,069,503 B2 | 6/2006 | Tanimoto |
| 7,076,332 B2 | 7/2006 | Cifra |
| 7,088,374 B2 | 8/2006 | David |
| 7,103,581 B1 | 9/2006 | Suen et al. |
| 7,103,873 B2 | 9/2006 | Tanner |
| 7,126,606 B2 | 10/2006 | Beda |
| 7,143,339 B2 | 11/2006 | Weinberg |
| 7,161,599 B2 | 1/2007 | Beda |
| 7,170,511 B2 * | 1/2007 | Sowizral et al. ............. 345/420 |
| 7,184,038 B2 | 2/2007 | Sowizral |
| 7,236,165 B2 | 6/2007 | Dautelle |
| 7,240,346 B2 | 7/2007 | Demsey |
| 7,265,756 B2 | 9/2007 | Schneider |
| 7,305,011 B2 | 12/2007 | Shae |
| 7,417,645 B2 | 8/2008 | Beda |
| 7,443,401 B2 | 10/2008 | Blanco |
| 7,466,315 B2 | 12/2008 | Beda |
| 7,477,259 B2 | 1/2009 | Beda |
| 7,486,294 B2 | 2/2009 | Beda |
| 7,511,718 B2 | 3/2009 | Subramanian |
| 7,548,237 B2 | 6/2009 | David |
| 7,619,633 B2 | 11/2009 | Beda |
| 2001/0000962 A1 | 5/2001 | Rajan |
| 2002/0019844 A1 | 2/2002 | Kurowski |
| 2002/0032697 A1 | 3/2002 | French |
| 2002/0046394 A1 | 4/2002 | Do |
| 2003/0110297 A1 | 6/2003 | Tabatabai |
| 2003/0120823 A1 | 6/2003 | Kim |
| 2003/0194207 A1 | 10/2003 | Chung |
| 2003/0210267 A1 | 11/2003 | Kylberg |
| 2004/0039496 A1 | 2/2004 | Dautelle |
| 2004/0110490 A1 | 6/2004 | Steele |
| 2004/0216139 A1 | 10/2004 | Rhoda |
| 2004/0220956 A1 | 11/2004 | Dillon |
| 2005/0050471 A1 | 3/2005 | Hallisey |
| 2005/0060648 A1 | 3/2005 | Fennelly |
| 2007/0057943 A1 | 3/2007 | Beda |

FOREIGN PATENT DOCUMENTS

| | | |
|---|---|---|
| WO | 99/00725 | 7/1999 |

OTHER PUBLICATIONS

Java 3D API Specification: Scene Graph Basics. Sun Microsystems, Inc. 1999. http://java.sun.com/products/java-media/3D/forDevelopers/j3dguide/SceneGraphOverview.doc.html.

Rikk Cary, Gavin Bell, Chris Marrin: "International Standard iso/iec 14772-1: 1997 Virtual Reality Modeling Language (vrml97)" VRML 97, 1997 pp. 1-236 XP002133320 p. 7, paragraph 3.18: pp. 89-99 section 6.20; p. 149, paragraph B.2.

PCT Int'l Search Report & Written Opinion on App. No. PCT/US04/25723.

Australian Search Report, Application No. SG 200302787-7 completed Jan. 12, 2005.

Hudson, S.E. and Stasko, J.T., Animation Support in a User Interface Toolkit: Flexible, Robust, and Reusable Abstractions, ACM SIGGRAPH Symposium on User Interface Software and Technology, Atlanta, GA, 57-67, 1993.

Walczak, K. and W. Cellary, "Building Database Applications of Virtual Reality with X-VRML". Proc. 7th. Int. Conf. on 3D Web Technology. 2002, SIGGRAPH. pp. 11-120. ISBN 1-58113-468-1.

Parr, T. And T. Rohaly. "A language for creating and manipulating VRML." Proc. 1st Symposium on Virtual Reality Modeling Lang. 1995, pp. 123-131.

Hesina, G.; Schmalistieg, D.; Furhmann, A.; Purgathofer, W. "Distributed Open Inventor; a practical approach to distributed 3D graphics." Proc. ACM Symp. On Virt. Reality Soft. And Tech. 1999, pp. 74-81.

Strauss, P. and R. Carey. "An Object-Oriented 3D Graphics Toolkit" SIGGRAPH (Proc. 19th Ann. Conf. on Comp. Graph. And Int. Tech.) 1992, pp. 341-349.

SVG specification version 1.1, Jan. 14, 2003 all sections. http://www.w3.org/TR/SVG.

SVG Tools, Adobe Illustrator, Jul. 6, 2001—http://web.archive.org/web/20010706131221/http://www.adobe.com/svg/tools/other.html.

Scalable Vector Graphics, Adobe SVG Viewer download area, Nov. 2001—http://www.adobe.com/svg/viewer/install/main.html.

W3C consortium, "XML Base", W3c recommendation Jun. 27, 2001.

Conal Elliot, Declarative event-oriented programming, Proceedings of the 2nd ACM SIGPLAN international conference on Principles and practice of declarative programming, p. 56-67, Sep. 20-23, 2000, Montreal, Quebec, Canada.

Notice of Allowance dated Jul. 2, 2007 cited in U.S. Appl. No 11/165,756.

Office Action mailed Apr. 4, 2008 cited in U.S. Appl. No. 11/454,719.

Office Action dated Sep. 11, 2007 cited in U.S. Appl. No. 10/693,822.

Notice of Allowance dated Apr. 1, 2008 in U.S. Appl. No. 10/693,822.

Office Action dated Nov. 16, 2007 cited in U.S. Appl. No. 10/401,717.

Office Action dated Nov. 16, 2007 cited in U.S. Appl. No. 10/693,633.

Office Action dated Jul. 17, 2007 cited in U.S. Appl. No. 10/693,630.

Office Action dated Mar. 20, 2008 cited in U.S. Appl. No. 10/693,630.

Office Action dated Oct. 5, 2007 cited in U.S. Appl. No. 10/693,673.

Office Action dated Apr. 9, 2008 cited in U.S. Appl. No. 10/693,673.
Office Action dated Apr. 3, 2008 cited in U.S. Appl. No. 11/499,257.
Notice of Allowance dated May 30, 2008 cited in U.S. Appl. No. 10/693,633.
Notice of Allowance dated Oct. 2, 2008 cited in U.S. Appl. No. 11/454,719.
Notice of Allowance dated Oct. 2, 2008 cited in U.S. Appl. No. 10/693,630.
Office Action dated Oct. 7, 2008 cited in U.S. Appl. No. 11/455,166.
Notice of Allowance dated Aug. 25, 2008 cited in U.S. Appl. No. 10/693,673.
Notice of Allowance dated Oct. 16, 2008 cited in U.S. Appl. No. 10/693,633.
Notice of Allowance dated Aug. 1, 2008 cited in U.S. Appl. No. 10/693,822.
Office Action dated Dec. 19, 2008 cited in U.S. Appl. No. 11/499,257.
Office Action dated Mar. 5, 2009 cited in U.S. Appl. No. 11/555,040.
Notice of Allowance dated Apr. 3, 2009 cited in U.S. Appl. No. 11/499,257.
Notice of Allowance dated May 5, 2009 cited in U.S. Appl. No. 11/455,166.
Notice of Allowance dated Jul. 9, 2009 cited in U.S. Appl. No. 11/455,166.
Office Action dated Sep. 16, 2009 cited in U.S. Appl. No. 11/555,040.
Notice of Allowance dated Sep. 9, 2008 cited in U.S. Appl. No. 10/693,822.
X3D specification (one section from Google cache) sections 6 and 18; 2005—http://www.web3d.org/x3dspecifications/ISO-IEC-19775-IS-X3DAbstractSpecifiction/.
W3C Scalable Vector Graphics (SVG); 2004 -History-http://www.w3.org/Graphics/SVG/History.

\* cited by examiner

INTELLIGENT CACHING DATA STRUCTURE FOR IMMEDIATE MODE GRAPHICS

CROSS-REFERENCE TO RELATED APPLICATIONS

This application claims priority to, the benefit of, and is a divisional application of copending U.S. patent application Ser. No. 11/455,166, filed Jun. 16, 2009, entitled "INTELLIGENT CACHING DATA STRUCTURE FOR IMMEDIATE MODE GRAPHICS", which is a continuation of U.S. Pat. No. 7,064,766, filed Jun. 27, 2002, entitled "INTELLIGENT CACHING DATA STRUCTURE FOR IMMEDIATE MODE GRAPHICS", which claims priority to U.S. Provisional Patent Application Ser. No. 60/330,418, filed Oct. 18, 2001, entitled "INTELLIGENT CACHING DATA STRUCTURE (ICDS) FOR IMMEDIATE MODE GRAPHICS". All of the above applications are incorporated herein by reference in their entireties.

FIELD OF THE INVENTION

The invention relates generally to computer systems, and more particularly to the processing of graphical and other video information for display on computer systems.

BACKGROUND

In contemporary computing systems, the capability of graphics and video hardware is growing at a fast pace. In fact, to an extent, the graphics system in contemporary computing systems may be considered more of a coprocessor than a simple graphics subsystem. At the same time, consumers are expecting more and more quality in displayed images, whether viewing a monitor, television or cellular telephone display, for example. However, memory and bus speeds have not kept up with the advancements in main processors and/or graphics processors.

As a result, the limits of the traditional immediate mode model of accessing graphics on computer systems are being reached. At the same time, developers and consumers are demanding new features and special effects that cannot be met with traditional graphical windowing architectures.

Although certain game programs have been designed to take advantage of the graphics hardware, such game programs operate with different requirements than those of desktop application programs and the like, primarily in that the games do not need to be concerned with other programs that may be concurrently running. Unlike such game programs, applications need to share graphics and other system resources with other applications. They are not, however, generally written in a cooperative, machine-wide sharing model with respect to graphics processing.

For example, performing animation with desktop applications currently requires specialized single-purpose code, or the use of another application. Even then, achieving smooth animation in a multiple windowed environment is difficult if not impossible. In general, this is because accomplishing smooth, high-speed animation requires updating animation parameters and redrawing the scene (which requires traversing and drawing data structures) at a high frame rate, ideally at the hardware refresh rate of the graphics device. However, updating animation parameters and traversing and drawing the data structures that define a scene are generally computationally-intensive. The larger or more animate the scene, the greater the computational requirement, which limits the complexity of a scene that can be animated smoothly.

Compounding the problem is the requirement that each frame of the animation needs to be computed, drawn, and readied for presentation when the graphics hardware performs a display refresh. If the frame is not ready when required by the hardware, the result is a dropped or delayed frame. If enough frames are dropped, there is a noticeable stutter in the animated display. Also, if the frame preparation is not synchronized with the refresh rate, an undesirable effect known as tearing may occur. In practice, contemporary multitasking operating systems divide computational resources among the many tasks on the system. However, the amount of time given for frame processing by the operating system task scheduler will rarely align with the graphics hardware frame rate. Consequently, even when sufficient computational resources exist, the animation system may still miss frames due to scheduling problems. For example, an animation task may be scheduled to run too late, or it may get preempted before completing a frame, and not be rescheduled in time to provide a next frame for the next hardware refresh of the screen. These problems get even more complex if the animated graphics need to be composited with video or other sources of asynchronously generated frames.

In general, the current (e.g., WM_PAINT) model for preparing the frames requires too much data processing to keep up with the refresh rate when complex graphics effects (such as complex animation) are desired. As a result, when complex graphics effects are attempted with conventional models, instead of completing the changes in the next frame that result in the perceived visual effects in time for the next frame, the changes may be added over different frames, causing results that are visually and noticeably undesirable. There are computing models that attempt to allow the changes to be put in selectively, by providing object handles to every object in the scene graph. Such models, however, require applications to track a significant number of objects, and also consume far too many resources, as the object handles are present even when the application does not want to make changes to the objects.

In summary, existing models of accessing graphics on computer systems are becoming inadequate for working with current display hardware and satisfying consumer expectations. A new model for processing graphics and video is needed.

BRIEF SUMMARY

Briefly, the present invention provides an intelligent caching data structure and mechanism for storing visual information. The intelligent caching data structure may be filled with objects and data representing graphics information, and is otherwise generally associated with mechanisms that intelligently control (e.g., optimize) how the visual information therein is populated and used.

The cache data structure can be traversed for direct rendering, (e.g., to render it to a bitmap to be sent over the network to a web browser, or to render it to a memory surface to interchange with legacy programs, systems or devices), or traversed for pre-processing the visual information therein into an instruction stream or the like that can be fed to a lower level system that performs faster compositing and animation. The data structure can also be pre-processed in other ways, such as to be sent across a network to a remote terminal, or to be sent to a printer.

The data structure includes data and other structures provided by an application program or the like, with much of the data typically having no external reference thereto. Such restricted, "write only" access to the structure via limited identity enables more of the information stored in the data structure to be optimized or otherwise processed, such as to conserve resources. For example, by not providing a handle to the data unless specifically requested by the application, the data in the cache data structure can be changed/processed into a different format that saves resources, such as a format that is more compact, or one that reduces or eliminates the need for subsequent, repeated processing, e.g., a bitmap or other post-processing result.

Also provided via the cache is a transaction/batching-like model for updating the data structure, which enables external modifications to the data structure to be done without interrupting reading from the data structure. The transaction/batching-like model also allows multiple changes to appear on the screen at once. By batching changes to multiple containers, multiple changes in different parts of the data structure appear on the screen at once. In one alternative, the transaction/batching model may be synchronized with the render thread. In another alternative, changes received to a container are queued atomically following the close of that container, and possibly others.

A method and mechanism are provided to call back to the application (or other higher-level) program code in order to create or re-create portions of the data structure as needed. Such an invalidation method enables resources to be conserved and/or reclaimed. For example, resources that may be needed in the future may be marked invalid such that they need not be allocated unless and until actually needed. Similarly, resources (e.g. memory) reserved for currently unneeded parts of the data structure may be reclaimed by marking the corresponding container or containers invalid, and via the invalidation method and mechanism, filled in only if later needed.

The present invention may be provided via a system and computer-executable components comprising, a cache that maintains visual information, a queue for maintaining changes to the visual information as requested by higher level program code, an interface to the cache through which the visual information is accessed by the program code, the program code accessing the visual information via the interface, including requesting access to a container in the cache, a drawing context that opens the container and provides a surface through which the program code requests changes to data in the container, and a batching mechanism, the batching mechanism deferring the writing of any change to the queue until at least the close of the container, such that changes to the container occur as an atomic operation.

A method and computer-readable medium having computer-executable instructions may include maintaining a scene graph, receiving a first request to implement a first change in a structure of the scene graph, receiving a second request to implement a second change in the structure, and implementing the changes to the first and second data atomically by making the changes only upon receipt of an instruction that requests implementation of the changes. Another method and computer-readable medium having computer-executable instructions may include receiving data corresponding to a scene graph, the data including a first set of the data without an external reference to the data, changing at least part of the first set of data to changed data in a different format, and maintaining the changed data in the scene graph. Another method and computer-readable medium having computer-executable instructions may include receiving data corresponding to a scene graph, determining that the data does not require an external reference thereto, and maintaining the data in the scene graph without an external reference thereto.

A system and computer-executable components may comprise a cache in the memory that maintains visual information including data and containers in a format that is independent of a receiving entity, a rendering mechanism that traverses the cache to provide processed data, the processed data corresponding to a format understood by a receiving entity, and the receiving entity receiving the instruction stream and producing the visible output therefrom. A method and computer-readable medium having computer-executable instructions may include maintaining visual information in a cache data structure including containers and data, determining when at least one container is not needed for providing visual information corresponding thereto when rendered, marking the container as invalid and reclaiming at least some of the resources associated with maintaining the container. Another method and computer-readable medium having computer executable instructions may include maintaining visual information in a cache data structure including containers and data, reserving an invalid container for storing graphics information, without having space allocated for the graphics information and rendering the data structure into data for receipt by another entity, including determining whether the graphics information of the invalid container is needed, and if so, allocating resources for the graphics information, calling back to higher-level program code to provide the graphics information, receiving the graphics information, and outputting the data for receipt by another entity including information corresponding to the graphics information received.

Other benefits and advantages will become apparent from the following detailed description when taken in conjunction with the drawings, in which:

DETAILED DESCRIPTION

Exemplary Operating Environment

Figure 1:
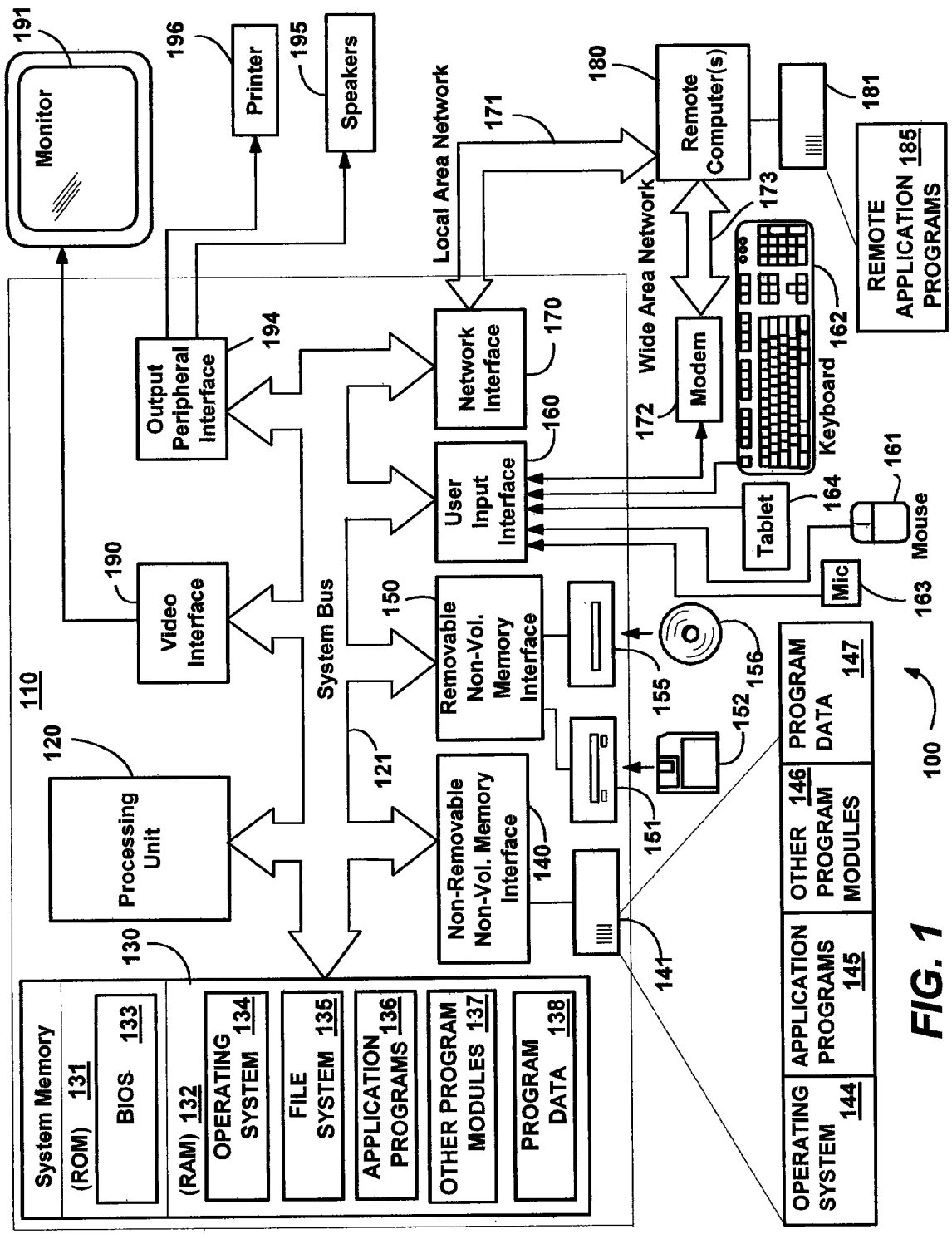
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 o m illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 10 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Media Integration Layer Architecture

Figure 2:
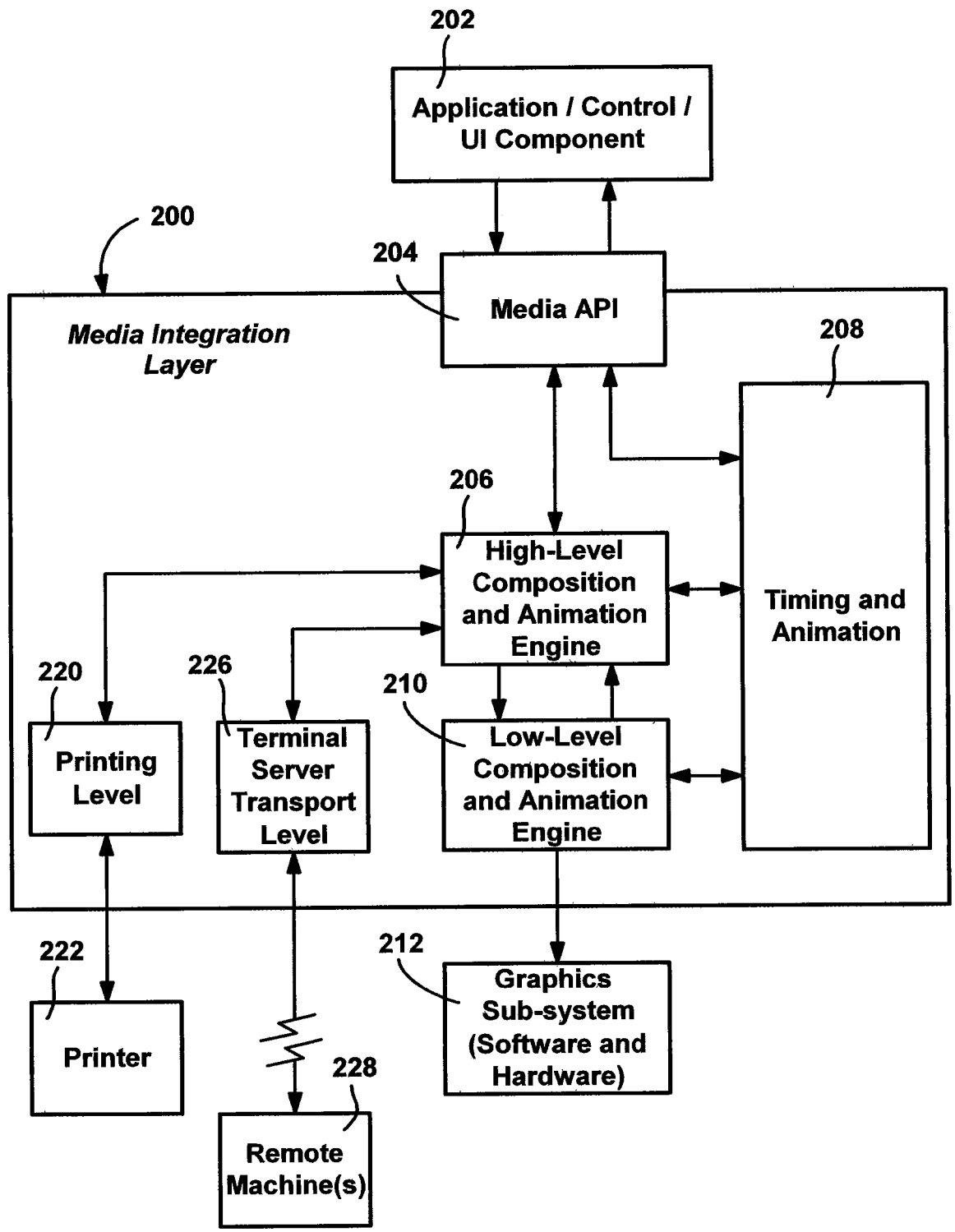
FIG. 2 is a block diagram representing one example architecture into which the present invention may be incorporated.

One aspect of the present invention is generally directed to leveraging more of the power of the graphics hardware that is present on typical computer systems. To this end, as generally presented in FIG. 2, a media integration layer architecture 200 is provided. An application, control or other similar higher-level program code (e.g., a user interface of an operating system component) 202 accesses the media integration layer architecture 200 via a set of application programming interfaces (APIs) 204 or the like, to access (write or read) graphical information. Note that although many of the examples described herein will refer to an application program interfacing with the APIs, it is understood that other higher-level program code and components (e.g., a user interface of the operating system) will also be able to interface with the lower level components described herein. As such, any reference to such higher-level program code, whether referred to as an application program, user interface, and so on, should be considered equivalent.

It should be noted that for various reasons including security, the media integration layer 200 (which outputs graphics) is preferably incorporated into the operating system. For example, while feasible to allow some or part of the media integration layer 200 to be inserted between the application and the operating system, doing so would enable a malicious program to display whatever graphics it wanted, and thereby cause harm. For example, malicious code could display a dialog box requesting entry of a password to thereby steal a user's password. Other reasons for incorporating the media integration layer 200 into the operating system include stability and efficiency, e.g., the lower levels can efficiently trust that the data and instructions from the higher layers are already verified. Further, the lower levels can expose interfaces that only the operating system is trusted to call responsibly, that is, without exposing those interfaces to unpredictable programs, thereby ensuring greater stability.

In one implementation, the media integration layer architecture 200 includes a high-level composition and animation engine 206, timing and animation components 208, and a low-level compositing and animation engine 210. As used herein, the terms "high-level" and "low-level" are similar to those used in other computing scenarios, wherein in general, the lower a software component relative to higher components, the closer the component is to the hardware. Thus, for example, graphics information sent from the high-level composition and animation engine 206 may be received at the low-level compositing and animation engine 210, where the information is used to send graphics data to the graphics subsystem including the hardware.

As described below, the high-level composition and animation engine (also referred to herein as the high-level compositor and animator or the high-level engine or component) 206 builds a display tree to represent a graphics scene provided by the application program 202, while the timing and animation components provide declarative (or other) animation and timing control. As also described below, the low-level compositing and animation engine (also referred to herein as the low-level compositor and animator or low-level engine or component) 210 composes the renderings for the scenes of multiple applications, and with rendering components, also referred to renderers, implement the actual rendering of graphics to the screen. Note, however, that at times it may be necessary and/or advantageous for some of the rendering to happen at higher levels. For example, while the lower layers service requests from multiple applications, the higher layers are instantiated on a per application basis, whereby is possible to do time consuming or application-specific rendering at a higher levels, and pass references to a bitmap to the lower layers.

In accordance with the present invention and as described below, a preferred display tree comprises an intelligent caching data structure, e.g., filled with objects and data and otherwise generally associated with mechanisms that intelligently control (e.g., optimize) how the visual information therein is populated and used. In general, the high-level composition and animation engine 206, along with higher level program code 202, builds the display structure and traverses the structure creating rendering instructions and simple animation intervals to be passed to the low-level compositing and animation engine 210. The rendering instructions generated by the high level compositor may contain timing and animation information. The low-level compositing and animation engine 210 takes the rendering instructions and animation intervals and manages the animating, rendering and composing the scene that is then provided to the graphics subsystem (e.g., the graphics software and hardware) 212.

Alternatively or in addition to locally displayed output, the high-level composition and animation engine 206 (or one similar thereto) may provide the rendering and animation instructions in an appropriate format to lower-level printing code 220 for sending fixed image data to a printer 222 or the like, and/or may provide rendering instructions and simple animation intervals in an appropriate format to a lower-level terminal transport server 226 for transmission to remote machines 228. Note that richer information also may be passed across the network, e.g., it may be desirable to have the remote machine handle mouse rollover effects locally, without any network traffic.

Multiple Graphics Processing Levels

Although not necessary to the present invention, in one implementation, the media integration layer architecture 200 thus separates graphics processing into multiple levels. Each of these levels performs some intelligent graphics processing which together allows applications, user interfaces and the like 202 to output graphics with smooth animation, composite the graphics with the graphics of other applications and with video frames. The animation and/or compositing may also be synchronized with audio output. For example, by synchronizing audio with the frame rate at the low level component, the timing of audio can essentially be exact with that of video or graphics, and not dependent on the ability of task-scheduled, complex pre-processing to keep up with the refresh rate.

Figure 3:
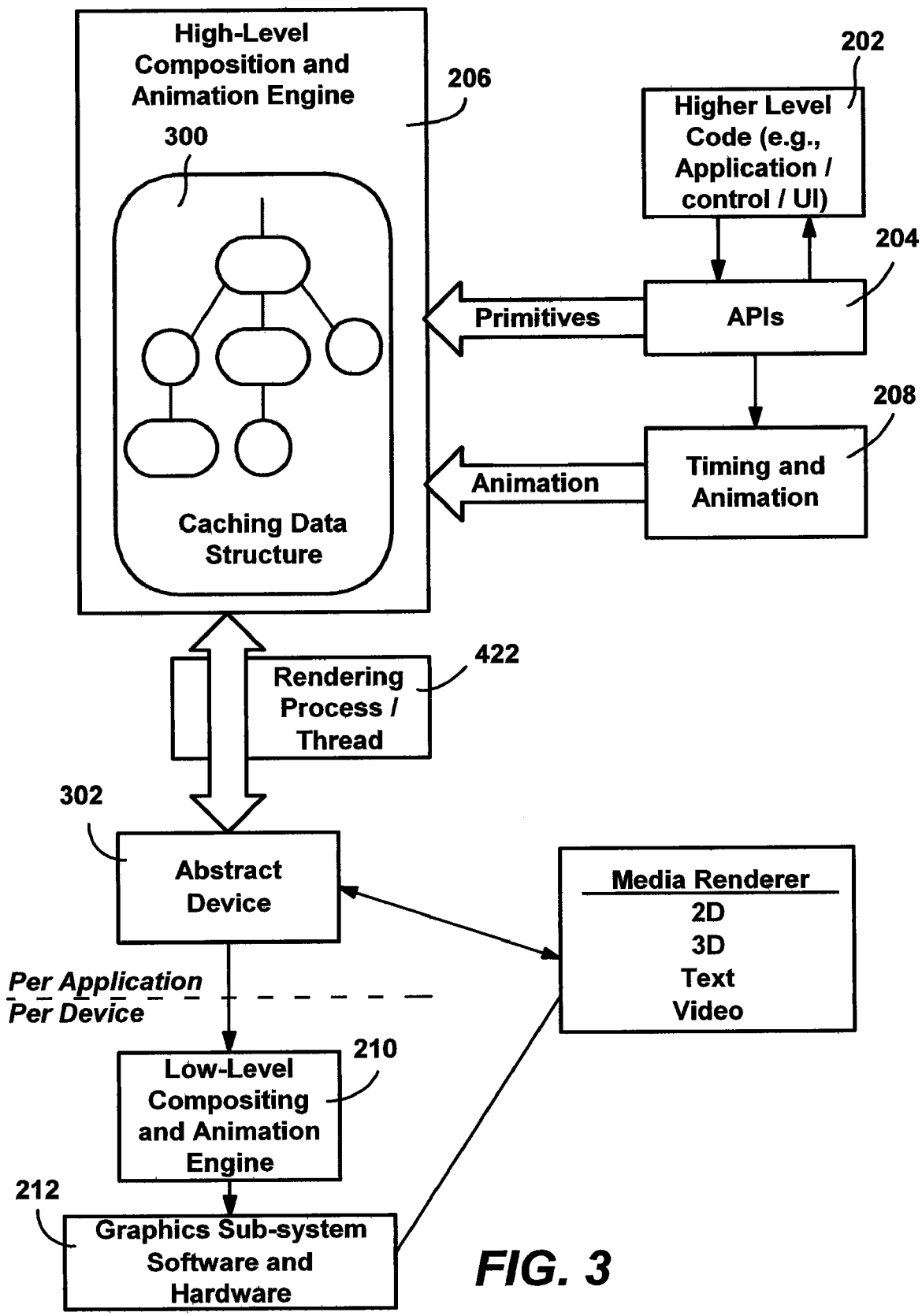
FIG. 3 is a block diagram representing an intelligent caching data structure and its relationship to various components in accordance with one aspect of the present invention.

In accordance with one aspect of the present invention, and as generally represented in FIG. 3, below the application 202 as communicated with via the APIs 204, the high-level compositor and animator engine 206 caches the application graphical data in a tree structure 300, pre-processes the data in an intelligent manner, and performs numerous other operations (described below) to facilitate the output of complex graphics. In one, multiple-level implementation, the high-level compositor and animator engine 206 performs complex processing (sometimes referred to as compiling) that significantly simplifies the amount of processing and significantly reduces the amount of data that other, lower levels need to deal with to render the correct output. Note, however, that the amount and type of processing that is performed by the higher level may be dependent to a significant extent on the load, configuration and capabilities of the lower levels. For example, if high capability graphics hardware is present, the higher level may do a lesser amount of processing, and vice-versa. The high-level and low-level layers are adaptive to these factors.

In keeping with the present invention, the high-level composition and animation engine 206 can accomplish such complex processing without overwhelming the available system resources because it operates at a relatively slower rate than the level or levels below. By way of example, and not limitation, the lower levels may operate at the frame (refresh) rate of the hardware graphics processor. For example, the high-level compositor and animator 206 may only operate when needed to effect a display change, on demand, or on another schedule (e.g., every half second). Note that while a single high-level compositor and animator engine 206 is represented in FIG. 3, there may be multiple instances of them, such as one per application, while there is typically only one low-level compositing and animation engine 210 per graphics device, e.g., one for each graphics hardware card on a machine.

Moreover, the high-level compositor and animator 206 can tailor its output to (or be designed to output) a format of the appropriate level or levels below, e.g., essentially any abstract device 302. For example, the high-level compositor and animator 206 can produce compiled output that is ultimately destined for a printer, for transmission over a network to a number of remote terminals for display thereon, or for the lower-level compositor and animator 210 that is present above local graphics software and hardware 212. A single high-level compositor and animator may process the output of an application for a plurality of abstract devices, or there may be a suitable instance of a high-level compositor and animator to process the output of an application for each type of abstract device, e.g., one for local graphics, one for a printer and one for a terminal server.

Further, the commands and other data provided by the high-level compositor and animator 206 can be simplified to match the capabilities and requirements of the hardware, e.g., the lesser the hardware, the more high-level pre-processing needed. Still further, the amount of high-level pre-processing may be dynamic, e.g., so as to adjust to the varying processing demands placed on the lower level or levels.

For local graphics output, in one configuration the media integration layer architecture 200 includes the high-level compositor and animator 206, and the low-level compositor and animator 210. As will be described below, in general, the high-level compositor and animator 206 performs complex processing of graphics information received from clients (e.g., applications) to build graphics structures and convert these structures into a stream of graphics commands. The low-level engine 210 then uses the streams of graphics commands from various clients to compose the desktop that is viewed by the computer user, e.g., the low-level compositor composes the desktop by combining the command streams emitted by the various clients present on the desktop into graphics commands consumed by a graphics compositing engine.

In this implementation, the high-level compositor and animator 206 performs the complex processing operations that build and convert the structures 300 into the stream of graphics commands at a rate (which may be only on demand) that is normally much slower than the hardware refresh rate of the graphics hardware of the graphics subsystem 212. As a result of this high-level pre-processing, the low-level engine 210 is able to perform its own processing operations within the hardware refresh interval of the graphics hardware of the graphics subsystem 212. As mentioned above, however, the low-level engine 210 can communicate back to the high-level engine 206 over a back channel so that the high-level pre-processing can dynamically adjust to the low-level processing demands. Note that the back-channel from the low-level compositor and animator 206 to the high-level compositor and animator 206 is primarily for communicating flow control (the low-level engine 210 signaling it needs more data or is receiving too much) to the high level engine 206 and/or error conditions actionable by the high level engine 206. One advantage of such communication is that the low-level compositing and animation engine 210 need not be concerned with priorities or scheduling, but can remain in synchronization with the refresh rate. Instead, the high-level CPU process scheduling already present in contemporary operating systems will control priority. Thus, for example, if an application process attempts to take too much of its share of high-level graphics pre-processing relative to its priority, it will be that application that is adversely affected in its output. Note, however, that when the low-level system is under heavy load, it can choose to prioritize the changes and demands of one process/high-level component over another. For example, the foreground application can be given priority.

The High-Level Compositor And Animator

In one embodiment, the media integration layer 200 including the high-level compositor and animator 206 adjusts for hardware differences on a given machine, because each user application cannot realistically be written to handle the many types and variations of graphics hardware. However, applications may also contribute to the improved graphics processing provided by the media integration layer 200, namely by providing more (and different) information to the high-level compositor and animator 206 than that presently passed to an operating system's graphics APIs. For example, applications that are aware of the media integration layer 200 may provide different data, including animation intentions and the like via the media integration layer APIs 202. By way of example, instead of performing animation by continually redrawing a slightly varied image, the application can provide an instruction as to how a particular image should move over time, e.g., relative to a fixed background. The media integration layer 200 then handles the automation in a smoothly rendered way.

Figure 4:
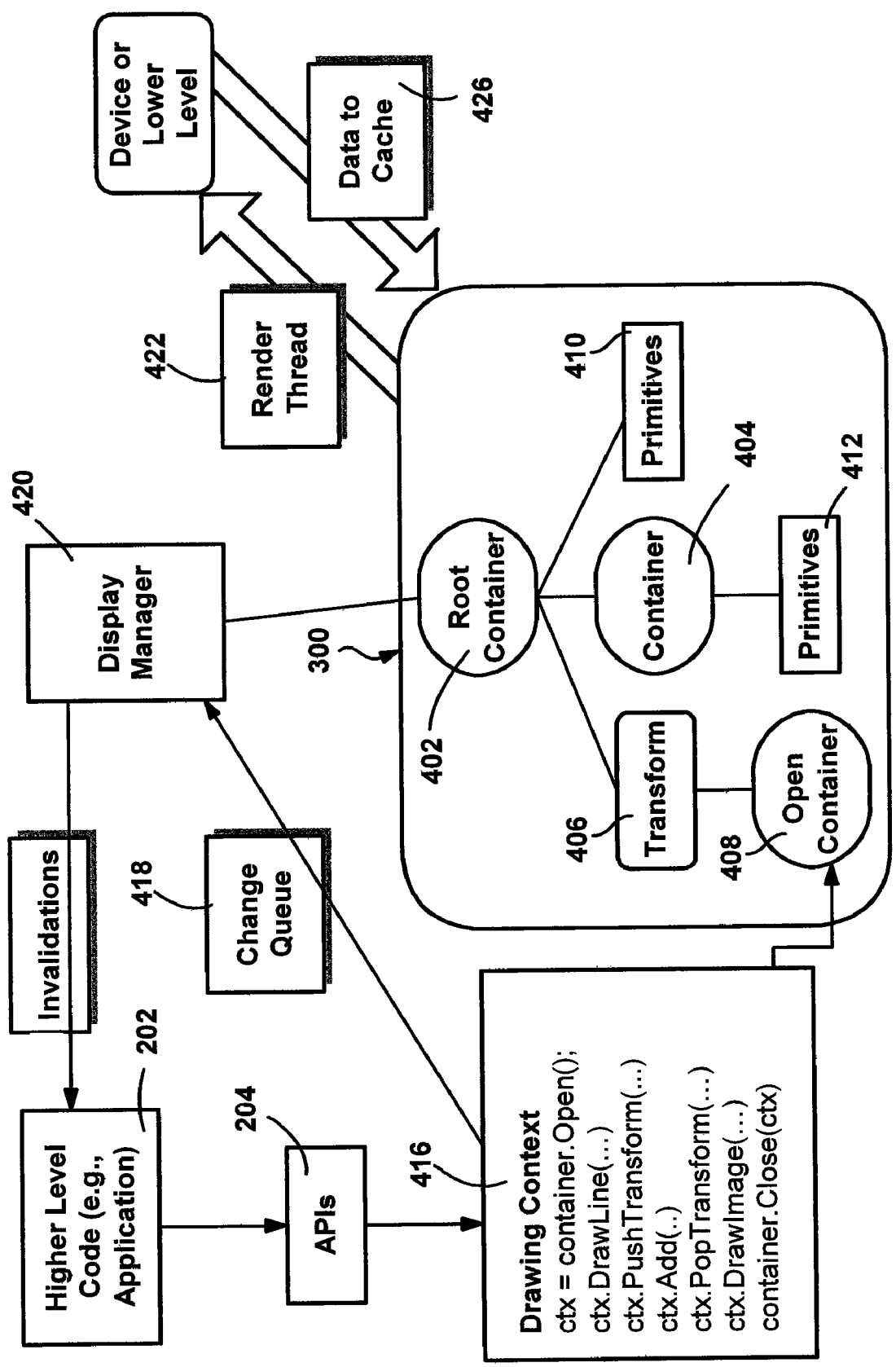
FIG. 4 is a block diagram representing the general flow of control between a high-level composition and animation engine and other levels, including a change queue alternative, in accordance with one aspect of the present invention.

In general, as represented in FIGS. 3 and 4, the application 202 builds a scene graph data structure via APIs 204. The data includes high level structure (e.g., containers) and primitive data, and is put into a cache data structure 300 that is used to intelligently cache visual information.

One of the objects (or structures) in the overall intelligent caching data structure 300 is a container, represented in FIG. 4 by containers 402, 404 or 408, (alternatively referred to as a Visual2D). In one implementation, a container (e.g., 404) provides identity in that an application can hold a handle to it, and includes procedural parameters which can be used for hooking up animation and templating, hit-testing and user data. Note however that the containers represented herein are not the only types of containers that might be exposed. Other examples may include containers that are optimized for storing lines in a paragraph or for storing many children in a grid. Children containers may be added and removed without clearing the current list of children, although certain types of containers may not allow random access to the children. The structure exposed through the API can be adapted as needed.

Other (internal) nodes of this data structure include transforms 406, alpha nodes, cache nodes, and primitive nodes 410, 412, used to store internal data not directly associated with an API container. Primitives are generally stored as a stream of instructions that can be passed directly to the graphics device.

Figure 5:
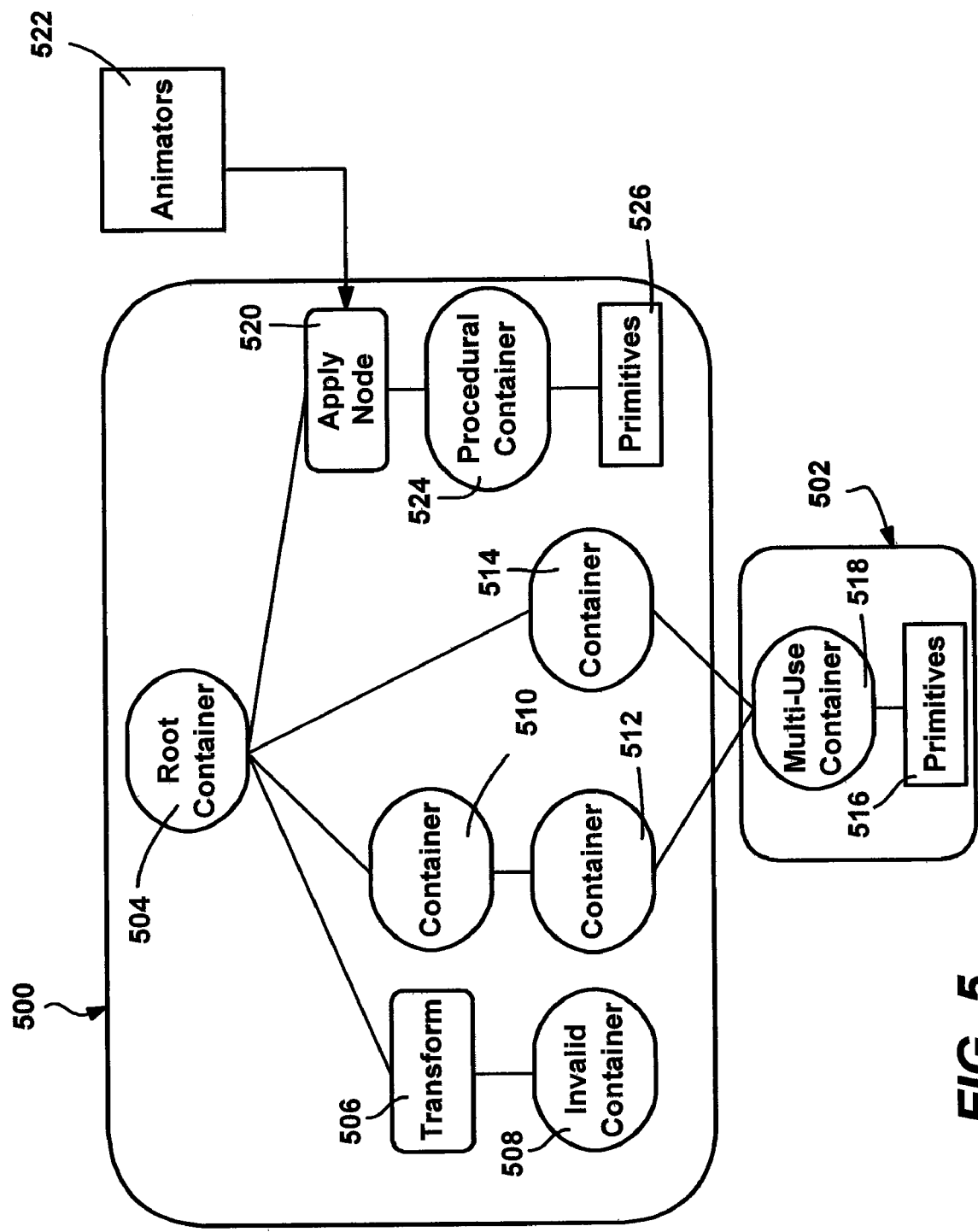
FIG. 5 is a block diagram representing example containers and other nodes cached in a simple data structure and their relationships in accordance with one aspect of the present invention.

As represented in the tree segment 500 of FIG. 5, a container such as 510 can thus hold other containers 512 or drawing primitives 516, wherein storage of the primitives inside of any container can be considered a stream of graphics instructions. A container can also store other containers, in effect creating a graph, i.e., containers can be referenced by more than one container so that the data structure is a directed acyclic graph (DAG) of containers and lists of primitives (wherein no container can contain one of its parent containers). As also represented in FIG. 5, by allowing trees to reference other trees in a graph-like way, any of the containers, such as the container 518 in the tree segment 502 may be reused in different places, yet with different parameters.

A container is populated via an open/close pattern, such as generally represented in the drawing context 416 of FIG. 4. More particularly, the higher level code 202 opens a container 408 in the data structure, provides the drawing context 416 to write drawing primitives and/or add other containers into the data structure, and then closes the container 408. In one alternative implementation, when the container is closed, its data is put into a change queue 418 that is then applied at some later time. The opening and closing of containers is one of the main mechanisms for changing the data structure. Note that other usage patterns may be employed, particularly for different types of containers.

In accordance with one aspect of the present invention, because the changes to the data structure are put into a queue or the like, a transaction-like (or batch-like) system for updating the data structure is enabled. As a result, when opening and writing to a container, no changes are apparent on the screen until the container is closed. The changes to the screen are atomic and there are no temporal artifacts (also referred to as structural tearing) of a partially drawn screen. Further, such transactional behavior can be extended so that changes to multiple containers are applied at once. In this way the higher level code 202 can set up many changes to a scene and apply those changes all at once.

In one alternative implementation, changes to the data structure are made asynchronously by posting changes to the queue 418 via a display manager 420, such that the changes will be processed on a rendering thread 422, and for example, sent to the low level compositor and animator 210, (wherein the abstract device 302 of FIG. 3 comprises the abstraction that encapsulates the conversion of rendering commands issued by the high level compositor 206 into rendering commands streamed to the low level compositor 210). The transaction-like model also enables modifications to the data structure to be made without interrupting reading from the data structure.

Although the above-described queue model enables the read passes from the high-level engine 206 to run independent of any actions that the user takes, user applications need the cache to maintain a consistent view of the APIs, which may lead to inefficiencies. By way of example, consider a user application on the main user thread setting a property on a container (object in the high-level engine 206). In the queue model, this property gets put into a queue to be applied to the high-level engine 206 data structure. However, if the user application tries to immediately read back that property from the container, the system will need to read the property back based on what is currently in the queue (which is inefficient), synchronize with the rendering thread and apply the pending changes in the queue (which is inefficient and would negate the benefits of having the queue), or keep copies of user changeable data, both the render version and the pending version, on the container (which is an inefficient use of memory).

Because there may be a considerable amount of reading back by applications, an alternative implementation essentially eliminates the queue by synchronizing the updating of the high-level engine 206 data structures and the main user thread. Although this enables the user application to freeze the rendering, the overall system is more efficient. However, to mitigate the perceived effects of possible freezing, various parts of the animation and timing system may be run independently to communicate information down to the low-level engine 210, while trusting the low-level engine 210 to do more animation processing independent of the high-level engine 206. Then, if the high-level engine 206 is frozen because of a user action, the output to the screen will still be relatively smooth and consistent.

Yet another alternative is to eliminate the render thread, and have the main user thread perform any processing necessary for the high-level engine 206 to pass the rendering instructions to the low-level engine 210. This is a more efficient use of threads in some cases.

Returning to FIG. 4, the container 408 comprises a basic identity node that contains drawing primitives, while the draw context 416 comprises a graph builder (e.g., a helper object) obtained from a container that can be used to add primitives, transforms, clips or other drawing operations to the container. The display manager 420 comprises a hosting object that represents an instance of the high-level compositor and animator 206, and for example, can attach to an hwnd (handle to a window) or an hvisual (handle to a visual container). The display manager 420 has a pointer to the root container 402 for the scene, dispatches events to the high level code when containers are invalid and need to be redrawn, and provides access to services such as hit testing and coordinate transforms.

In accordance with another aspect of the present invention, although the higher level code 202 can hold a handle or the like to some of the objects in the data structure and containers, most of the objects in the container do not have an identity from the perspective of the application. In particular, access to this structure is restricted in that most usage patterns are "write only." By limiting identity in this manner, more of the information stored in the data structure can be optimized, and the higher level code 202 does not have to store object information or deal with managing the objects' lifetimes.

For example, the resources that maintain part of the graph that is not needed (e.g., corresponds to visual information that has been clipped or scrolled off the screen) may be reclaimed, with the application requested to redraw the scene if later needed. Thus, generally when a container is opened its contents are cleared and forgotten. If those contents do not have identity, then they may safely disappear so that the resources for them can be reclaimed by the system. If the higher level code 202 or some other part of the graph is holding onto child containers, those containers stay around and can be reinserted. However, this pattern can be changed and adapted depending on the needs of the higher level code 202.

Thus, to summarize, the container is an object that has identity in that the high level program code using the data structure can hold a handle to that object. The opposite of an object with identity is plain data, and while the user code may employ a mental model that treats the data without identity as an object, once this data is committed to the system there is no way to later reference that object. In this manner, the object can be transformed and changed in ways that are convenient to the system.

As a simplified example, an API function for drawing a line of text might include a TextLine object. The user of this object would prime the TextLine object with the actual text to be drawn, along with the other information on how to render different runs of that text (font, size, brush, and so forth). When the user program code wants to actually add that line of text to the data structure, the program code may take a drawing context for a particular open node, and pass the TextLine object into a drawing function on the drawing context. The system in effect takes the data that is in that TextLine object and copies the data into the data structure. Because this data does not have identity, the high-level compositor and animator engine 206 is free to take the contents of that line, run algorithms (e.g., OpenType) to break the text down to glyphs with positions, and store the positioned glyph data instead of the raw text. After that line was drawn the system would have no reference to the TextLine object that was used to draw the line, i.e., the data that the system stores does not have any identity.

Alternatively, the higher level code 202 may request that identity be preserved on that TextLine object, requiring the storing of a reference to that object in the data structure. In this manner, if the higher level code 202 later changes the TextLine object, the system will discover that change and reflect it in the rendered output. Note that in a more realistic example, identity would not be exposed on the text line object itself, but rather the application would hold a handle to a container and make changes as desired by parameterizing that container, as described in the aforementioned U.S. Patent Application entitled "Generic Parameterization for a Scene Graph." Nevertheless, one of the main aspects of the data structure is to reduce the need for the higher level code 202 to create such objects with identity, whereby a reduced number of points in the data structure will be referenced by the controlling code 202. This enables more optimization of the data structure.

For example, because of the reduction in the amount of identity exposed outside of the data structure, an optimization such as the dense storage of primitives is enabled. To this end, vector graphic data is stored in a "primitive list" or primitive container. These containers are implementation specific and are not exposed with identity to the higher-level code 202. When the caller writes data into a container, that data is either stored in separate objects that are linked in, like the containers, (e.g., with transforms), or can be streamed into a packed and flattened data array. This array may not only store the vector graphic data in a compact way, but may also track the resources that go along with those primitives. Because the individual primitives do not have identity, there is no need to separate the primitives out or provide a way for the user to change those primitives later, enabling more efficient storage of the primitives.

As another optimization, when a sub-graph is not changing, it is possible to store a bitmap of the contents of that tree, and attach the bitmap to a container, thereby reducing the amount of high-level processing needed. Further, when a sub-graph or part of a primitive list requires significant processing before it can be passed to a lower-level code for rendering, (e.g. tessellation of vector graphics before being handed off to a hardware device), the post-processed result may be cached for later reuse.

Moreover, since there is no exposure of the structure except for specific read operations (described below), the data structure is free to reorganize containers so long as the rendered result is the same. A container may therefore store the child containers in a space partitioning tree to optimize rendering and other read operations. Further, the data structure may be displayed multiple times on the same device or on multiple devices. For this reason the caches may be keyed based on device if they are device dependent. If a subtree is recognized as being static, repainted often because of animations around it and yet is dense enough to warrant the resource drain, a cache node may be automatically inserted for that sub-tree.

For rendering, the data structure is read (either at some scheduled time or by a different thread) and processed information of some form is passed to the lower-level animator and compositor 210. To this end, in one alternative implementation, a render object and thread (per process) 422 traverses the data structure 300 to drive the render process. In another alternative, instead of running on its own thread, the render process may share time on a common thread with the rest of the user's code in a type of "cooperative multitasking" arrangement. The data structure 300 can be used for direct rendering, although preferably it is compiled into the visual information that is fed to the lower-level components for very fast compositing and animation. The data structure 300 can also be compiled in different ways, such as to be sent across a network to a remote terminal, to a printer and/or serialized to disk or some other more permanent storage medium for interchange or caching.

n one alternative implementation, the data structure 300 is read for rendering on another thread 422. However, it should be noted that the use of another thread is not a requirement, e.g., the "render thread" may alternatively comprise a cooperative sharing mechanism that runs on the same thread as everything else. In the alternative model that uses a rendering process/thread, the rendering thread runs as needed to provide the intended effect.

In keeping with the present invention, each time the thread runs, it first applies any pending changes that are in the change queue 418. The render thread 422 then walks the data structure 300 to collect information such as bounding boxes and collect invalidations (described below). Lastly it walks the areas that have changed since last time or need to be rendered for some other reason, and executes the rendering instructions that are stored in the data structure. Note that in the alternative model that does not use the change queue, changes are applied directly, as they are being made, and thus do not need to be applied here.

Thus, rendering from the data structure 300 is a multiple pass process which may run on a separate render thread 422, including a pass that applies queued changes made to the data structure, a pass that pre-computes including iterating the data structure and computing data required for rendering such as bounding boxes, animated parameter values, and so forth, and a render pass. The render pass renders based on the abstract device 302, e.g., that will ultimately delegate to the low-level compositor and animator 210. During the render pass, intermediate cached resources 426 can be cached in order to improve rendering performance on subsequent frames.

Possible results of the last walk of the data structure include that the data is executed directly and displayed on the screen, or executed on a back buffer that is flipped at the end of the last walk. Other results include the data being brought together with extended timing and animation information (as described in the aforementioned U.S. Patent Application entitled "Multiple-Level Graphics Processing System and Method") and passed down to a rendering thread/process that runs much more frequently. The walk may also result in data being executed onto a bitmap for a screen capture or other reasons, directed to a printer, or directed across a network and then used for any of the previous reasons on the remote machine. A combination of these results is also possible.

As can be appreciated, storage of the data in the data structure 300 may require a large amount of memory. Further, much of the data in the data structure 300 may not be needed because it is not visible, due to clipping, scrolling or other reasons. In accordance with another aspect of the present invention, to reduce resource demand, the data structure 300 can be built on demand. To enable this, there is provided a method for calling back to the higher level code 202 in order to create portions of the data structure 300 as needed. This method has been referred to as "invalidation" and is similar to the WM_PAINT callback method used in conventional graphics systems, but applies to the structure 300 and cached contents instead of applying directly to bits on the screen. However, in one queue model alternative, read operations (like hit testing and coordinate transformation, described below) apply changes first, so the model presented to the user is synchronous.

Containers (e.g., the container 508 of FIG. 5) can be made invalid when they are created, when content is thrown away by the system because of low resources, or when the higher level code directly requests for the container to be made invalid. For example, the higher level code 202 can create a container, and provide a graphical size defining where and how big that container is to be. During a render operation, if that container was marked as invalid but is now determined to be needed, the render thread 422 will ask the higher level code 202 to fill in the container. The render thread 422 can wait for the higher level code 202 to complete the request, or continue the render without the data that is needed. The first option is not ideal, but may be necessary under some circumstances. In certain situations, it may be desirable to have the application tell the higher level code 202 what it wants to put in the cache as soon as possible, essentially pre-filling the cache.

When the data is eventually filled in, the render thread 422 will run again to display those new changes. In one current implementation, the request to fill in a container is placed in another queue to get back to the thread running the higher-level code 202. However this may be done other ways, including a synchronous call to the higher level code 202 on the same thread on which the renderer is running. However, making any such call synchronous will stall the rendering thread.

In addition to queuing updates to the data structure 300, there is a need to provide for services to read back from the data structure 300. Such services include hit testing, point transformations and sub-graph sizing.

Hit testing is a process whereby a point is given in the coordinate space of some root of the data structure, and the data structure is probed such that the containers or primitives that are hit by that point are returned. In a current implementation, the hit testing process is controlled by the values of three flags stored on each container, (although additional flags are feasible). A first flag includes a setting that instructs the hit test algorithm to stop and return the hit test results collected thus far. A second flag includes a setting that tells the hit testing algorithm to include that container in the result list if the point being hit does indeed hit that container. A third flag controls whether or the children of that container should be hit tested against.

Another read service is point transformation, wherein given two nodes connected through the graph, there is a service whereby a point in the coordinate frame of one container can be converted to the coordinate frame of another container. There are three general subtypes, including transforming from an ancestor to a descendent, from a descendent to an ancestor and from peer to peer (any arbitrary node to any other arbitrary node). The read service thus provides a way to query the data structure for coordinate transforms, and leverages the tree architecture to walk up and compute the transform. Animation/changes may be locked while doing multiple transforms, and performing transforms through a common ancestor may be provided.

Another read service is sub-graph sizing. Given a node, this service returns the graphical size of that node and its sub-graph. This may be in the form of a size that is guaranteed to be large enough to contain the sub-graph, some perhaps different size that is just large enough to contain the sub-graph, or a more complex shape detailing the contours of the sub-graph.

An implementation may want to synchronize these read operations with changes to the data structure. To this end, if the change queue is applied before any of these read operations are called, a more consistent view is presented to the higher level code.

The Low-Level Compositor and Animator

As described above, the high-level engine 206 can intelligently compile and/or modify the caching data structure 300 of the present invention for a number of purposes, and can tailor its output to a number of possible receiving entities, including direct rendering to a display, printing, bitmap capture, remote network communication and so forth. One of the possible receivers of this output is the low-level animator and compositing engine 210. Although not necessary to the present invention, an example of the low-level animator will be described herein for purposes of explaining operation of the intelligent caching data structure as used with the high-level animator and compositing engine 206. It is understood, however, that this is only one example, and that the output or other suitably formatted output may be provided to other receiving entities.

Figure 6:
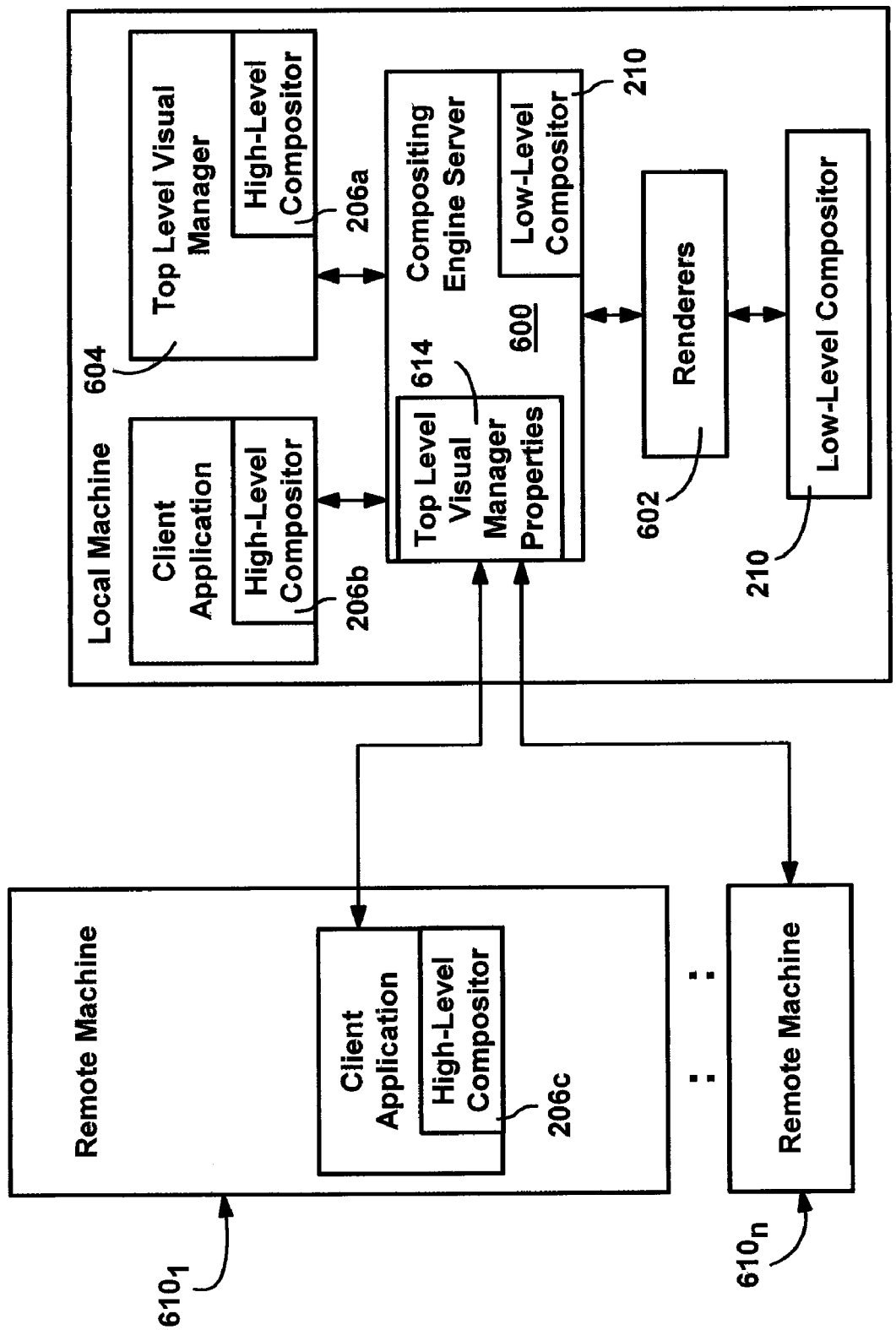
FIG. 6 is a block diagram representing general components of a low-level composition and animation engine interacting with other components in accordance with one aspect of the present invention.
Figure 7:
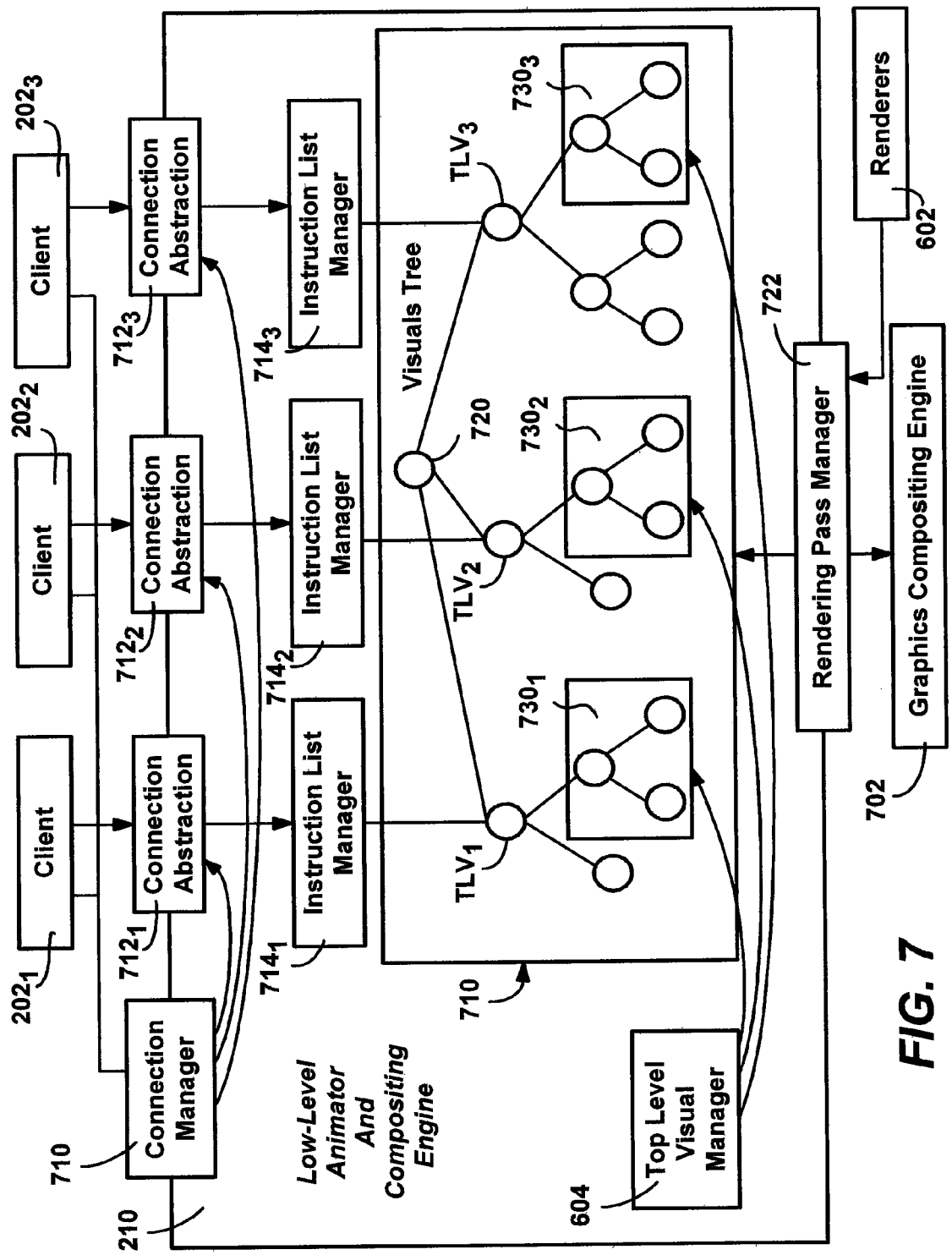
FIG. 7 is a block diagram representing general components of the low-level composition and animation engine in accordance with one aspect of the present invention.

A primary purpose of the low-level animator and compositing engine 210 is to provide an abstraction of the low-level rendering stack of the media integration layer 200, which allows for high frame rate animation for client graphics applications, the implementation of window management-like support, and support for remoting graphics services over a network connection. As represented in FIGS. 6 and 7, the low-level animator and compositing engine 210 may be arranged as a compositing engine server 600 that coordinates high frame rate animation requests received from multiple clients (e.g., corresponding to applications) by using services provided by a collection of renderers 602. The renderers 602 generate rendering actions that act on rendering abstractions (also referred to as visuals) implemented by a graphics compositing engine 606.

The low-level animator and compositing engine 210 also provides top level visual management support, comprising infrastructure aimed at allowing a special client (a top level visual manager 604) to manipulate visuals used by client applications as rendering areas on the screen. Each of the client applications $202_1$-$202_3$ (only three are shown in FIG. 7, but there may be any number) rendering to the rendering stack owns a top level visual ($TLV_1$-$TLV_3$, respectively), and the top level visual manager 604 is a client that has authority over the layout of top level visuals on the screen. In general, the low-level animator and compositing engine 210 composes the desktop by combining command streams emitted by the various clients present on the desktop into graphics commands consumed by the graphics compositing engine 606. The low-level animator and compositing engine 210 also helps the components that use it to implement a rendering architecture that makes programming user interfaces for remote machines $610_1$-$610_n$ the same as for local machines.

FIG. 7 shows the interaction between the low-level animator and compositing engine (server) 210 and its clients. As described above, the top level visual manager 604 is also a client. As also described above, clients $202_1$-$202_3$ of the low-level animator and compositing engine 210 use an instance of a high-level compositor and animation engine 206 to build graphics structures and convert these into a stream of graphics commands that the low-level animator and compositing engine 210 uses to compose the viewed desktop. In one embodiment, there is only one low-level animator and compositing engine 210, handling command streams issued by clients (e.g., high level compositors) running on either the local or a remote machine.

Returning to FIG. 6, interprocess communication may be performed via a property system 614 maintained by the low-level animator and compositing engine (server) 210. Properties associated with each top level visual are stored by this property system 614. Clients can write and read these properties, and clients can be notified on request of changes to property values.

The low-level animator and compositing engine 210 provides client-server communication, fast animation rendering, and top level visual management support. In one implementation, communication between the low-level animator and compositing engine 210 and clients occurs via a single bidirectional byte stream and/or shared memory. For the byte stream, local clients use interprocess communication, while remote clients open a network byte stream connection. The byte stream is a transport layer for a communication protocol that controls client server interaction.

The communication protocol includes three primary messages, namely request, reply and event messages. Error messages are also provided. The client-to-server communication primarily comprises rendering instructions, while the server-to-client communication is primarily feedback, in the form of responses and error messages, as described below.

A request is generated by the client to the server, and may include top level visual management commands, rendering instruction commands and timing interval commands. A reply may be sent by the server to the client in response to a request. It should be noted, however, that not all requests are answered with replies; replies are generated only in response to appropriate requests that seek information. For example, draw instructions do not need a reply. However, a "Get window size" request needs and receives a reply.

An event is sent from the server to the client and contains information about a device action or about a side effect of a previous request. For example, the server can communicate an event message to the client for resource invalidation, and also to inform the client of a target frame rate. The ability to communicate target frame rates enables variable frame rates, which is desirable because it ensures a consistent frame rate, rather than a high frame rate.

Errors may also be sent to the client. An error is like an event, but is generally handled differently by the client, e.g., to compensate for the error.

Before a client can use the services provided by the low-level animator and compositing engine 210, the client first establishes a connection to the engine 210, via entry points provided by a connection manager 710 (FIG. 7). The connection manager 710 allocates a communication object (e.g., $712_1$) that encapsulates the bidirectional byte stream transport layer for the client server protocol. It also allocates an instruction list manager (e.g., $714_1$) which keeps track of rendering instructions coming over the instruction stream and associates them with the correct visual.

Once a connection is established, the client 202 requests the creation of a top level visual. In response to the request, the low-level animator and compositing engine 210 creates the top level visual (e.g., $TLV_1$) by using services provided by the graphics compositing engine 606. The visuals maintained by the low-level animator and compositing engine 210 for its clients are organized in a tree structure 718. When a client is done with the top level visual, it requests its destruction. Note that a root node 720 is a special visual representing the background of the desktop, and the children of the root visual are top level visuals.

As represented in FIG. 7, one significant role of the low-level animator and compositing engine 210 is to manage the rendering to the computer desktop, which is accomplished by relying on the services of two other components, namely the graphics compositing engine 606 and a collection of renderers 602. The graphics compositing engine 606 provides low-level compositing services via rendering abstractions referred to as visuals. A visual is a rectangular rendering area that gets composed into the desktop and which can be rendered via a set of APIs supplied by the graphics compositing engine 606. When it is time to compose the desktop, a rendering pass manager 722 traverses the tree from left to right and for each node uses the rendering component to render to the visuals.

In addition to lifetime management of top level visuals, the low-level animator and compositing engine 210 also supports top level visual adornment, essentially adding decorations around the top level visuals. Adornments 730$_1$-730$_3$ are visuals that render decorations supplied by the top level visual manager in the form of rendering instruction lists. These visuals are children of the top level visual to which they belong. The client (e.g., application) can control adornments provided by the top level visual manager by setting predefined properties on the top level visual.

The low-level animator and compositing engine 210 also supports minimizing services for top level visuals, which can also be supplied by the top level visual manager 604 in terms of rendering instruction lists. Top level visual positioning, sizing and Z-order are supported, as well as three-dimensional effects specified for visual manager actions, like visual close and minimize. Thus, although the implementation is primarily described with respect to two-dimensional graphics, the system can be easily used for storing other types of media including three-dimensional graphics, video and audio.

As described above, the rendering instruction lists that the top level visual manager needs are generated by a high-level animator and compositor 206. The low-level animator and compositing engine 210 defines a set of top level visual actions that have default behaviors, such as minimize or close. If the top level visual manager 604 wants to customize such a behavior, it uses the high-level APIs to build a description of the action it wants to replace. It then sends the instruction stream for the action across to the low-level animator and compositing engine 210. The low-level animator and compositing engine 210 stores this description in its property system 614 and uses it when the client requests the specified action.

Top level visual decorations are performed with the use of the property system 614. At startup the top level visual manager sends instruction lists, generated with the high level engine 206, describing top level visual manager decorations. Updates to these decorations are done through the property system 614, i.e., when the client wishes to update a decoration, the client sets a named property to the desired value. The low-level animator and compositing engine 210 then notifies the top level visual manager 604 that a property has changed. In response, the top level visual manager 604 reads the property and updates the geometry on the low-level animator and compositing engine 210.

As further described in the aforementioned U.S. Patent Application entitled "Generic Parameterization for a Scene Graph," the instruction lists are parameterized, which generally means that the top level visual manager 604 does not need to be involved in simple changes, such as modifying the color of a graphical image. In such cases, the client instead sends down a new parameter (e.g., the new color), and the decoration is re-rendered with the same instruction list, but using the different parameter. This also provides the ability to store only one copy for each decoration description.

Figure 8:
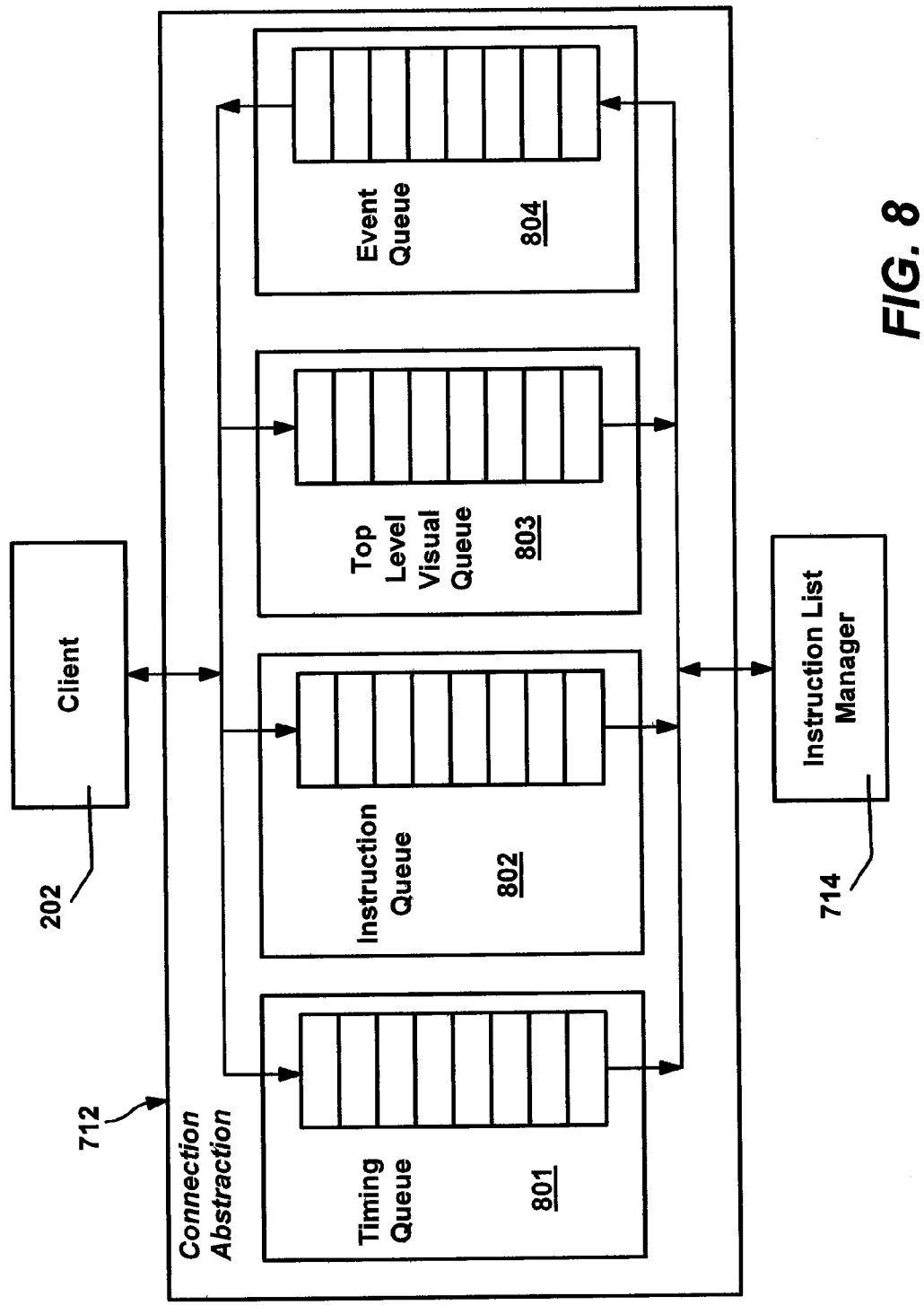
FIG. 8 is a block diagram representing logical structure of a connection to the low-level composition and animation engine in accordance with one aspect of the present invention.

FIG. 8 shows a logical structure of queues 801-804 that implement the client-server communication channel. Timing intervals are embedded in the animated rendering instructions. At render time, the low-level animator and compositing engine 210 passes the current time together with the timing intervals to the renderers. In turn, the renderers use the timing intervals to interpolate the correct parameters for rendering, as described below. The animated rendering instructions are managed by the instruction list manager 714 in response to instruction commands received from the high-level clients. The instruction list manager queues 714 the rendering instructions as they are received. The rendering queues are in Z-order, and the rendering pass manager 722 consumes them at compose time.

In addition to queuing timed rendering instructions, the instruction list manager 714 supports other operations, including emptying the queues 801-804, removing instruction from the queues, adding instruction to the queues, replacing a queue with a new instruction list, and applying a fixed time offset to the queues. A special case for timing controlled rendering is when only the visibility of a rendering instruction is controlled. In such an event, the timing intervals can be used to control the lifetime of an instruction in the rendering queue.

There may be situations when a client needs nested visuals to properly render its contents, such as when video is present in a scene. Because video updating is preformed by an independent rendering process, the low level engine 210 relies on the graphics compositing engine compose the video and the geometry that overlaps it. This is accomplished by creating new visuals contained in the client application's top level visual, which hides the asynchronous nature of video updating in the graphics compositing engine's compositing pass. The overlapping geometry that shares a visual needs has the same type of alpha behavior (per pixel or transparent).

Animation

In general, animation is accomplished by both the high-level compositor and animation engine 206 and the low-level compositor and animation engine 210. As described above, the media integration layer is divided into multiple graphics processing levels below the user interface or application level. The high-level engine 206 traverses the scene and updates animation parameters with intervals for later interpolation, and packages these simplified data structures into instructions that get passed to the lower-level engine 210. This may be done in a synchronous and/or asynchronous manner. The interval data can be considered as including the timing endpoints, (start and end timing data), as well as the parameterized values for the rendering instruction. Note that the high-level engine 204 can perform some or all of a requested interpolation, e.g., if an interpolation or other motion function is too complex for the lower-level engine 210 to handle, or the lower-level cannot keep up with the processing demands placed thereon, the higher-level engine can perform some or all of the calculations and provide the lower-level with simplified data, instructions, tessellations, and so on to accomplish the desired result. In a typical case when the lower level does perform interpolations, for each frame of animation, the low-level engine 210 interpolates the parameter intervals to obtain instantaneous values, and decodes the instructions into rendering commands executed by the graphics device. The graphics device composes the final scene adding any video frames that might be present in the scene. Other data also may be added, such as content protected by digital rights management.

Communication between the high-level engine 206 and low-level engine 210 is accomplished via an instruction stream. The high-level engine 206 writes rendering instructions to the stream at its slower frequency, or on demand. The low-level engine 210 reads the stream for instructions and renders the scene. Note that the low-level engine 210 may also obtain data needed to render the scene from other sources, such as bitmaps and the like from shared memory.

Thus, the high-level, (e.g., tick-on-demand) engine 210 updates animation parameters and traverses the scene data structures as infrequently as possible while maintaining smooth animation. The high-level engine 206 traverses the scene data-structures, computes an interval describing each animated parameter for a period of time, and passes these intervals and simplified parameterized drawing instructions to the low-level engine 210. The parameter data includes start time, end time, interpolator and interpolation data. By way of example, instead of erasing and redrawing an image so that it appears to move, the high-level compositor and animation engine 206 can instruct the low-level compositor and animation engine 210 as to how the image should change over time, e.g., starting coordinates, ending coordinates, the amount of time (interval) that the image should move between the coordinates, and a motion function, e.g., linear. The low-level compositor and animation engine 210 will interpolate to determine new positions between frames, convert these into drawing instructions that the graphics device can understand, and pass the commands to the graphics device.

Each pass of the high-level engine 206 preferably provides sufficient data for the low-level engine 210 to perform smooth animation over several frames. The length, in time, of the shortest interval may be used to determine the minimum frequency at which the high-level engine 206 needs to run to maintain smooth animation. Scenes that are entirely static or only include simple animations that can be defined by a single interval only require that the high-level engine 206 run when changes are made to the scene by the calling program 202. Scenes containing more complicated animations, where the parameters can be predicted and accurately interpolated for short periods, but still much greater than the hardware refresh rate, require that the high-level engine 206 run at relatively infrequent intervals, such as on the order of once every half seconds. Highly complex animations, where at least one parameter can not be predicted, would require that the high-level engine 206 run more frequently (until at an extreme the system would essentially degenerate to a single-level animation system).

The frequency at which the high-level engine 206 runs need not be uniform or fixed. For example, the high-level engine 206 can be scheduled to run at a uniform interval that is no larger than the minimum interval provided by an animate parameter in the scene. Alternatively, the minimum interval computed on each run of the high-level engine 206 may be used to schedule the next run, to ensure that new data will be provided to the low-level engine 210 in a timely manner. Similarly, when structural changes are made to the scene and/or its animated parameters, the frequency of the high-level engine 206 may be run to ensure that the new scene is accurately animated.

The low-level (e.g., fast-tick) engine 210 is a separate task from the high-level engine 206. The low-level engine 210 receives the simplified parameterized drawing instructions and parameter intervals describing the scene from the high-level engine 206. The low-level engine maintains and traverses these data structures until new ones are provided by the high-level engine 206. The low-level engine may service multiple high-level engines 206, maintaining separate data structures for each. The one-to-many relationship between the low-level engine 210 and high-level engine 206 allows the system to smoothly animate multiple scenes simultaneously.

The low-level engine 210 interpolates instantaneous animation parameters based on the high-level engine's provided intervals, updates drawing instructions and renders the scene for every frame. The low-level engine 210 task runs at a high priority on the system, to ensure that frames are ready for presentation at the graphics hardware screen refresh rate. The interpolations performed by the low-level engine 210 are thus typically limited to simple, fast functions such as linear, piecewise linear, cubic spline and those of similar speed. The low-level engine 210 runs at a regular frequency, or frame rate, that is an integral divisor of the hardware refresh rate. Each frame rendered by the low-level engine 210 will be displayed for a consistent number or refreshes by the graphics hardware.

The high-level traversal process 902 occurs in multiple passes. In a pre-compute pass, the first traversal of the tree 900 performs calculations needed for drawing. For example, bounding boxes are calculated for each subtree, and animate values are updated. As described above, rather than a single instantaneous value, an animator 1104 may provide an interval. The interval includes the start and end times, which type of interpolator to use, and the data for the interpolation. The resources used by the display tree are then sent to the low-level engine 210 for realization.

Figure 9:
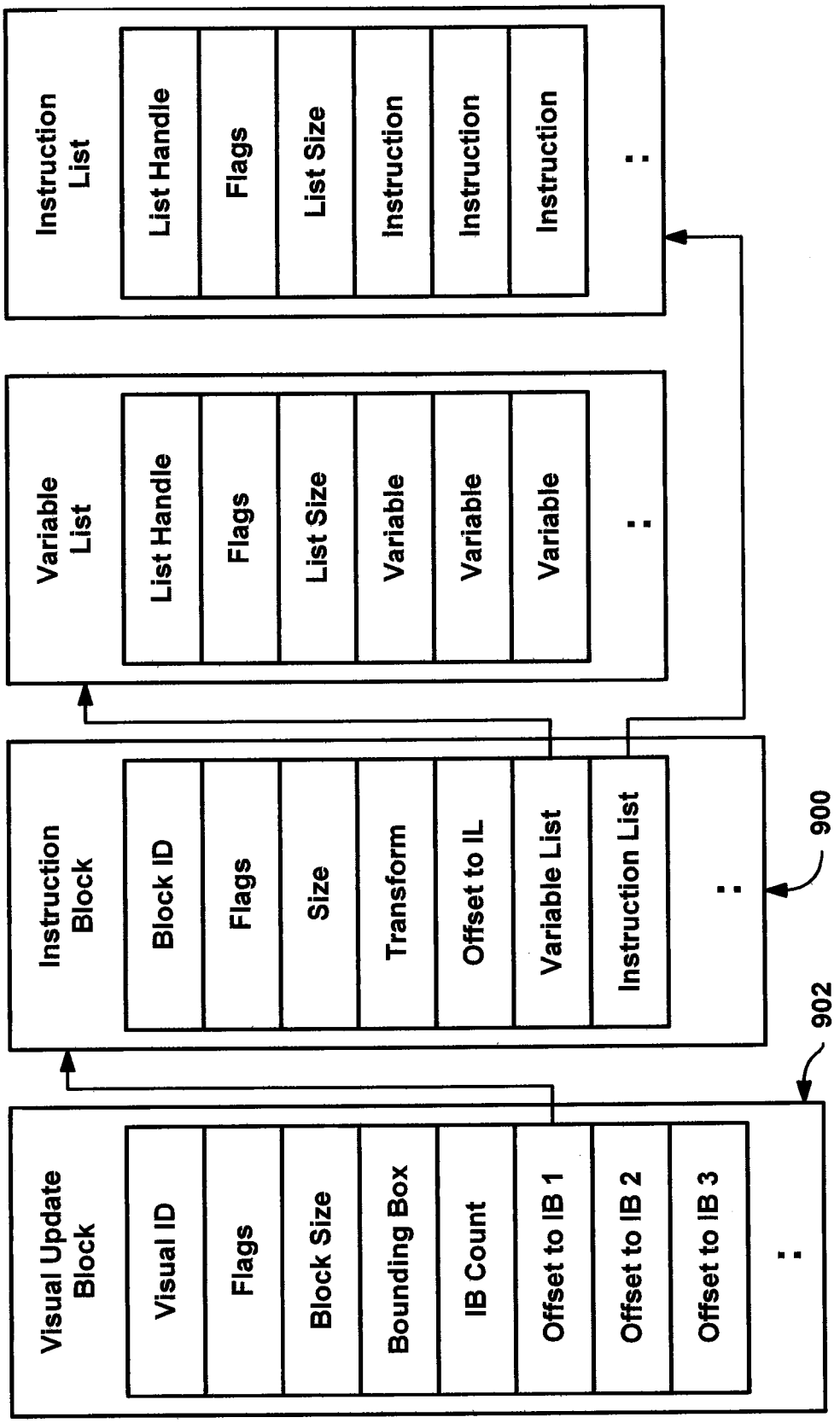
FIG. 9 comprises example data structures that may be used to communicate information rendered from the cache data structure to another entity such as a low-level composition and animation engine in accordance with one aspect of the present invention.

A second traversal packages the information describing the scene to be sent to the low-level engine 210 for rendering. As represented in FIG. 9, the high-level engine 206 accumulates instruction blocks 900 into a single visual update block 902 for each top level visual (i.e., window). Instruction block subtrees that have not changed since the last traversal are not appended. Instruction blocks for subtrees with only declarative animation changes will only include the variable block of interpolation information. Instruction blocks for subtrees that have been repositioned with a transformation only include the header.

The low-level engine 210 rendering thread (or process) runs in a loop, rendering and composing visuals at high-frame rate, ideally the refresh rate of the display. The loop applies any visual update blocks received from the high-level engine 206. Interpolated values for resources and windows being drawn on this pass are updated. For each variable in the instruction block's variable list, the instantaneous value for the next frame is computed. Then, the loop iterates over the offsets to locations in the instruction list where it is used, memory copying the new value.

Updated off-screen resources are rendered, although alternatively resources could be rendered on their first use. Instruction lists for each top level visual are rendered, and the data "blt-ed" to the display, flipped, or otherwise arranged to cause each top level visual to be updated on screen.

Remote Transport

As described above, the high-level engine 206 produces related sets of data that are transported to the low-level engine 210, including resources such as images and text glyphs, animation intervals/variables that describe how a variable used for rendering changes over a short period of time along with information on where it is used, and instruction lists that describe the positioning rendering operations required to render a top-level visual (window). Instruction lists can contain references to variables in place of static values.

First, the high-level engine 206 creates the resources, which need to be created before use, and are referenced by opaque handles in instruction list. The high-level engine 206 creates resources by first creating a device independent representation of the resource. In the case of an image the representation is a full-frame bitmap or an encoded image in a format such as JPEG. For communication, the high-level engine 206 then submits the resource data to a communication stub which assigns it a unique handle. The handle is generated in the high-level engine 206 process and is unique only within that process.

Instruction lists, variables, time values and animation intervals work together. The instruction list describes the rendering and may contain references to variables in place of static values. Animation intervals describe how to vary the value of the variable over a short period of time.

The high-level engine 206 collects instruction lists and animation intervals as part of its rendering pass. The high-level engine 206 packages the rendering information into one or more instruction blocks per top-level visual (window). Each block represents a subtree of the graph for a particular window. Each block contains a list of variables that affect the instruction list. The instruction lists maintained in the high-level engine 206 include references to the variables used. These variable references are collected for each variable and converted into locations (offsets) in the instruction list that must be replaced by the instantaneous of the variable before rendering. These offsets are packaged with the animation interval information for that block.

FIG. 9 shows visual update data structures. In general, the collection of instruction blocks describing a window is collected into a visual update block 902, as described above. The update block is then packaged into a packet in the same way as the resource described above. Update blocks may be large and could be sent in multiple packets if that is more efficient for the transport.

The low-level engine 210 has a normal priority thread that listens to the transport stream and process packets as they arrive. The work is preferably done on a separate thread from the render thread to ensure the low-level engine 210 can render every refresh. The communication thread parses each packet based on the operation code (opcode), high-level engine identifier (ID), object handle.

As can be readily appreciated, because graphics instructions are sent rather than individual graphics bits, the amount of data that needs to be communicated between the high-level engine and low-level engine is significantly reduced. As a result, the graphics instructions from the high-level processing system can be transmitted over a network connection to remote terminals, which each have a low-level processing system. The resultant graphics output can appear substantially the same over a number of terminals, even though the bandwidth of the connection could not carry conventional graphics data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

CONCLUSION

As can be seen from the foregoing detailed description, there is provided an intelligent caching data structure and mechanisms that provides numerous benefits over contemporary graphics mechanisms. The data structure enables data to be changed to conserve resources, batched changes to be applied, rendered in different ways for different receiving entities. Other data in the structure may be invalidated and created as needed by calling back to higher-level code that is creating the scene being cached, such that resources need not be allocated for unneeded portions of a scene.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

We claim:

1. In a computing environment, a method comprising:
maintaining a scene graph;
receiving a first request to implement a first change in a structure of the scene graph;
receiving a second request to implement a second change in the structure; and
implementing the first and second changes to the structure of the scene graph automatically by making the changes only upon receipt of an instruction that requests implementation of the changes, wherein implementing the changes comprises, writing change data to a change queue, and further comprising, applying the changes in the change queue to the scene graph and traversing the scene graph to generate an instruction stream based on the scene graph including the changes to the structure, wherein the changes in the change queue and the traversing of the scene graph occur at a first operating rate to provide the instruction stream to a low-level component, and further comprising, executing the low-level component at a second operating rate to provide drawing commands based on the instructions to a graphics subsystem, the second operating rate being greater than the first operating rate and corresponding to a frame rate of the graphics subsystem.

2. The method of claim 1, wherein implementing the changes comprises, writing change data to a change queue.

3. The method of claim 1, wherein the instruction that requests implementation of the changes corresponds to a close command.

4. The method of claim 1 wherein the structure comprises a container, and further comprising, receiving a command to open the container prior to receiving the first and second requests, and opening the container and clearing the instructions.

5. The method of claim 1 further comprising, receiving an access request to access the structure, and returning a drawing context in response to the access request.

6. The method of claim 1 wherein implementing the changes atomically comprises, making the changes based on receipt of the instruction and receipt of at least one other instruction that corresponds to at least one other structure in the scene graph.

7. A computer-readable storage medium having stored thereon computer-executable instructions, comprising:
maintaining a scene graph;
receiving a first request to implement a first change in a structure of the scene graph;
receiving a second request to implement a second change in the structure; and
implementing the first and second changes to the structure of the scene graph atomically by making the changes only upon receipt of an instruction that requests implementation of the changes, wherein implementing the changes comprises, writing change data to a change queue, and further comprising, applying the changes in the change queue to the scene graph and traversing the scene graph to generate an instruction stream based on the scene graph including the changes to the structure, wherein the changes in the change queue and the traversing of the scene graph occur at a first operating rate to provide the instruction stream to a low-level component, and further comprising, executing the low-level component at a second operating rate to provide drawing commands based on the instructions to a graphics subsystem, the second operating rate being greater than the first operating rate and corresponding to a frame rate of the graphics subsystem.

8. The computer-readable medium of claim 7, wherein implementing the changes comprises, writing change data to a change queue.

9. The computer-readable medium of claim 7, wherein the instruction that requests implementation of the changes corresponds to a close command.

10. The computer-readable medium of claim 7 wherein the structure comprises a container, and having at least one further computer-executable instruction comprising, receiving a command to open the container prior to receiving the first and second requests.

11. The computer-readable medium of claim 10, having further computer-executable instructions comprising, opening the container and clearing the instructions.

12. The computer-readable medium of claim 7 having further computer-executable instructions comprising, receiving an access request to access the structure, and returning a drawing context in response to the access request.

13. The computer-readable medium of claim 7 wherein implementing the changes atomically comprises, making the changes based on receipt of the instruction and receipt of at least one other instruction that corresponds to at least one other structure in the scene graph.

14. In a computing environment, a system comprising:
a maintaining module for maintaining a scene graph;
a receiving module for receiving a first request to implement a first change in a structure of the scene graph;
the receiving module receiving a second request to implement a second change in the structure; and
an implementing module for implementing the first and second changes to the structure of the scene graph automatically by making the changes only upon receipt of an instruction that requests implementation of the changes, wherein implementing the changes comprises, writing change data to a change queue, and further comprising, applying the changes in the change queue to the scene graph and traversing the scene graph to generate an instruction stream based on the scene graph including the changes to the structure, wherein the changes in the change queue and the traversing of the scene graph occur at a first operating rate to provide the instruction stream to a low-level component, and further comprising, executing the low-level component at a second operating rate to provide drawing commands based on the instructions to a graphics subsystem, the second operating rate being greater than the first operating rate and corresponding to a frame rate of the graphics subsystem.

* * * * *